United States Patent
Yu

(10) Patent No.: US 9,621,270 B2
(45) Date of Patent: Apr. 11, 2017

(54) SYSTEM AND METHODS FOR FIBER AND WIRELESS INTEGRATION

(71) Applicant: ZTE CORPORATION, Shenzhen (CN)

(72) Inventor: Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 18 days.

(21) Appl. No.: 14/495,090

(22) Filed: Sep. 24, 2014

(65) Prior Publication Data

US 2015/0086212 A1 Mar. 26, 2015

Related U.S. Application Data

(60) Provisional application No. 61/881,717, filed on Sep. 24, 2013.

(51) Int. Cl.
| | |
|---|---|
| *H04J 14/06* | (2006.01) |
| *H04B 10/63* | (2013.01) |
| *H04B 10/2575* | (2013.01) |
| *H04L 27/36* | (2006.01) |
| *H04L 27/38* | (2006.01) |
| *H04L 5/04* | (2006.01) |

(52) U.S. Cl.
CPC ....... *H04B 10/25752* (2013.01); *H04B 10/63* (2013.01); *H04J 14/06* (2013.01); *H04L 5/04* (2013.01); *H04L 27/365* (2013.01); *H04L 27/3827* (2013.01)

(58) Field of Classification Search
CPC .... H04B 10/614; H04B 10/6166; H04B 1/38; H04J 11/003; H04J 14/06; H04L 5/04; H04L 52/42

USPC .................................................. 398/115–117
See application file for complete search history.

(56) References Cited

U.S. PATENT DOCUMENTS

| | | | | |
|---|---|---|---|---|
| 7,054,296 B1 * | 5/2006 | Sorrells | ................... | H04B 1/406 370/338 |
| 8,098,990 B2 * | 1/2012 | Hu | ...................... | H04J 14/0282 370/352 |
| 8,417,126 B2 * | 4/2013 | Mandai | ................... | H04J 14/06 398/152 |
| 8,897,648 B2 * | 11/2014 | Cvijetic | ........... | H04B 10/25754 398/115 |
| 9,154,231 B2 * | 10/2015 | Kaneda | .................. | H04B 10/63 |

(Continued)

OTHER PUBLICATIONS

Pang et al., "100 Gbit/s Hybrid Optical Fiber-Wireless Link in the W-Band (75-100 GHz)", Opitcs Express, vol. 19, No. 25, pp. 24944-24949 (2011).*

(Continued)

*Primary Examiner* — David Payne
*Assistant Examiner* — Tanya Motsinger
(74) *Attorney, Agent, or Firm* — Drinker Biddle & Reath LLP

(57) ABSTRACT

Embodiments of the present invention pertain to optical wireless architecture and, in particular, to novel optical architecture to provide fiber-optic and wireless communication systems, links, and access networks. Certain embodiments of the invention pertain to a novel method and apparatus to provide 109.6 Gb/s capacity over spans of 80-km SMF and 2×2 MIMO. Conversion of PM-QAM modulated wireless mm-wave signal to an optical signal as well as 80-km fiber transmission of the converted optical signal is also realized.

8 Claims, 10 Drawing Sheets

(56) References Cited

U.S. PATENT DOCUMENTS

| | | | | |
|---|---|---|---|---|
| 9,210,014 | B2* | 12/2015 | Ichikawa | H04B 7/10 |
| 9,281,915 | B2* | 3/2016 | Kaneda | H04B 10/6166 |
| 2009/0067843 | A1* | 3/2009 | Way | H04B 10/506 398/79 |
| 2010/0021166 | A1* | 1/2010 | Way | H04J 14/02 398/79 |
| 2010/0290552 | A1* | 11/2010 | Sasaki | H04B 7/0413 375/267 |
| 2011/0158576 | A1* | 6/2011 | Kissa | G02F 1/225 385/3 |
| 2013/0083722 | A1* | 4/2013 | Bhargava | H04W 72/085 370/315 |
| 2013/0107341 | A1* | 5/2013 | Zeng | H04B 10/548 359/238 |
| 2013/0195455 | A1* | 8/2013 | Jansen | H04B 10/506 398/65 |
| 2013/0216228 | A1* | 8/2013 | Nazarathy | H04B 10/272 398/65 |
| 2014/0270786 | A1* | 9/2014 | Poddar | H04B 10/61 398/116 |
| 2014/0301734 | A1* | 10/2014 | Fang | H04J 14/005 398/76 |
| 2014/0341587 | A1* | 11/2014 | Nakashima | H04B 10/2572 398/115 |
| 2015/0139649 | A1* | 5/2015 | Kikuchi | H04J 14/06 398/65 |
| 2016/0043794 | A1* | 2/2016 | Ashrafi | H04B 7/0697 370/329 |
| 2016/0154175 | A1* | 6/2016 | Downie | G02B 6/02019 398/144 |

OTHER PUBLICATIONS

Nippon Telegraph and Telephone Corporation, *NTT Group CSR Report 2011*, 98 pages.
Koenig et al., "100 Gbit/s Wireless Link with mm-Wave Photonics", *OFC/NFOEC Postdeadline Papers*, 3 pages (2013).
Pang et al., "100 Gbit/s Hybrid Optical Fiber-Wireless Link in the W-Band (75-100 GHz)", *Optics Express*, vol. 19, No. 25, pp. 24944-24949 (2011).
Kanno et al., "Optical and Radio Seamless MIMO Transmission with 20-Gbaud QPSK", *ECOC Technical Digest*, 3 pages, 2012).
Li et al., "Investigation of Interference in Multiple-Input Multiple-Output Wireless Transmission at W Band for an Optical Wireless Integration System", *Optics Letters*, vol. 38, No. 5, pp. 742-744 (2013).
Li et al., "Fiber-Wireless Transmission System of 108 Gb/s Data Over 80 km Fiber and 2 x 2 Multiple-Input Multiple-Output Wireless Links at 100 GHz W-Band Frequency", *Optics Letters*, vol. 37, No. 24, pp. 5106-5208, (2012).
Dong et al., "Integration of 112-Gb/s PDM-16QAM Wireline and Wireless Data Delivery in Millimeter Wave RoF System", *OFC/NFOEC Technical Digest*, 3 pages, (2013).
Li et al., "A 400G Optical Wireless Integration Delivery System", *Optics Express*, vol. 21, No. 16, pp. 18812-18819 (2013).
Sambaraju et al., "Radio Frequency Transparent Demodulation for Broadband Wireless Links", *OSA/OFC/NFOEC*, 3 pages (2010).
Sambaraju et al., "100-GHz Wireless-Over-Fiber Links With Up to 16-Gb/s QPSK Modulation Using Optical Heterodyne Generation and Digital Coherent Detection", *IEEE Photonics Technology Letters*, vol. 22, No. 22, pp. 1650-1652, (2010).

\* cited by examiner

SYSTEM AND METHODS FOR FIBER AND WIRELESS INTEGRATION

CROSS-REFERENCE TO RELATED APPLICATIONS

This application claims priority to U.S. Application No. 61/881,717, filed Sep. 24, 2013.

FIELD OF THE INVENTION

We propose and experimentally demonstrate a novel architecture of fiber-wireless-fiber link. The proposed system has throughput comparable with fiber-optic communication.

BACKGROUND

High-speed integrated optical wireless system can be used to provide high-speed mobile backhaul between the wireless macro stations as well as emergency services when large-capacity long-haul optical cables are cut during natural disasters such as earthquake and tsunami [1]. In order to realize the high-speed integrated optical wireless system, the wireless links need to be developed to match the capacity of high-speed fiber-optic communication systems, while preserving transparency to bit rates and modulation formats [2-8]. Due to inherent wide bandwidth available at higher frequencies, wireless transmission in mm-wave band is expected to provide multi-gigabit wireless data transmission and it has been intensively studied in the research community. Moreover, high-speed wireless mm-wave generations enabled by photonic technique effectively promotes the seamless integration of wireless and fiber-optic networks. Recently, experimentally demonstrated 100 G and 400 G optical wireless integration systems adopting PM-QAM, photonic mm-wave generation and advanced digital signal processing (DSP) were reported. However, in the previous reports, the generated high-speed PM-QAM modulated wireless mm-wave signal is demodulated in the electrical domain and has limited radio-frequency (RF) cable transmission distance at such a high frequency band. Furthermore, the electrical demodulation of the high-speed PM-QAM modulated wireless mm-wave signal will become more complicated with the increase of transmission bit rate and mm-wave carrier frequency. A RF transparent photonic mm-wave demodulation technique is proposed in [9] based on coherent detection and baseband DSP, and offers an advantage of converting the QAM modulated wireless mm-wave signal into the optical baseband signal. The converted optical baseband signal can be directly transmitted in a fiber-optic network. However, the transmitted mm-wave signal is consisted of the demonstrated optical wireless integration system adopting the photonic mm-wave demodulation technique has neither wireless nor long-haul fiber transmission [10]. It is well known that the polarization multiplexing technique is a practical solution for the future spectrally-efficient high-speed optical transmission to double the capacity of a fiber link. Thus, it is necessary for us to investigate how to realize this polarization multiplexing signal transmission in an optical wireless integration system.

SUMMARY OF THE INVENTION

This invention proposes and experimentally demonstrates an optical wireless integration system at W-band, in which, up to 109.6-Gb/s PM-QAM signal transmission has been demonstrated over 80-km SMF-28, then delivered over 2-m 2×2 MIMO wireless link and finally transmitted over another 80-km SMF-28. For the first time, we realize the conversion of the PM-QAM modulated wireless mm-wave signal to the optical signal as well as 80-km fiber transmission of the converted optical signal.

DESCRIPTION OF THE INVENTION

Figure 1A:
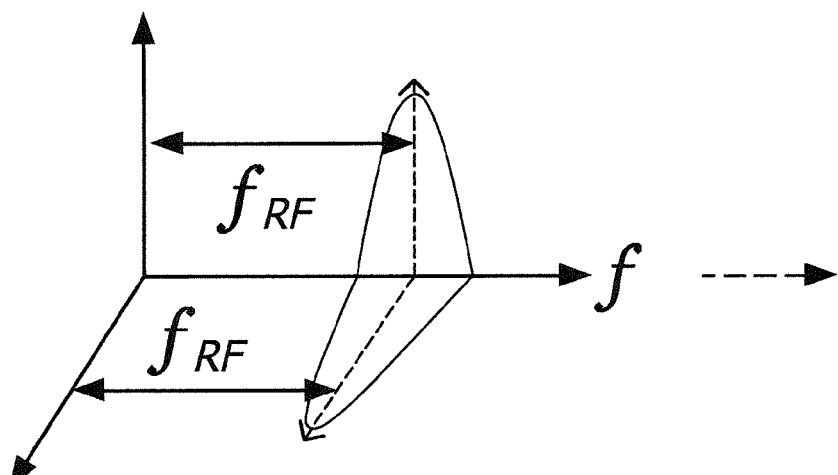
FIG. 1 shows the principle of integrated fiber-wireless-fiber link system for PM-QAM signal transmission. Schematic optical spectra after: a) optical heterodyne up-conversion; b) optical OCS modulation; c) TOF.
Figure 1B:
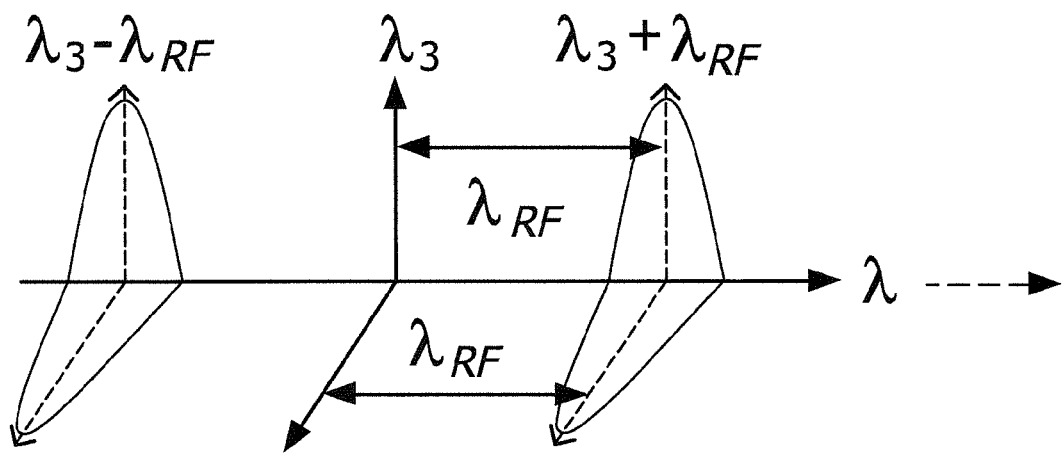
Figure 1C:
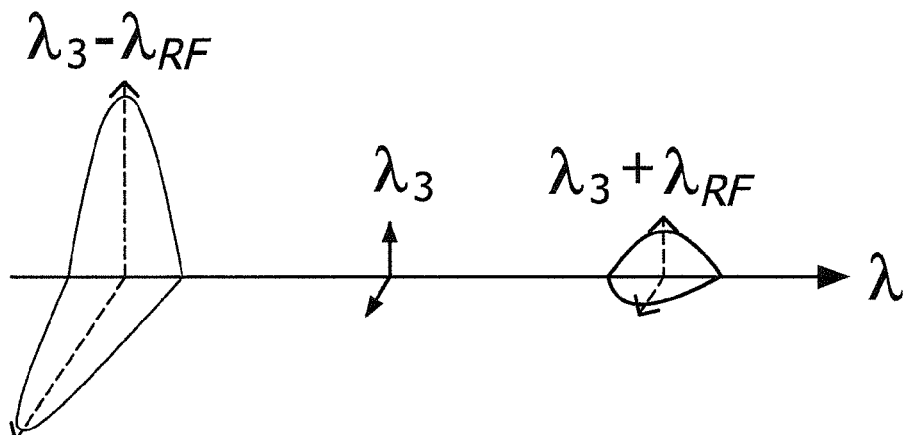
Figure 1D:
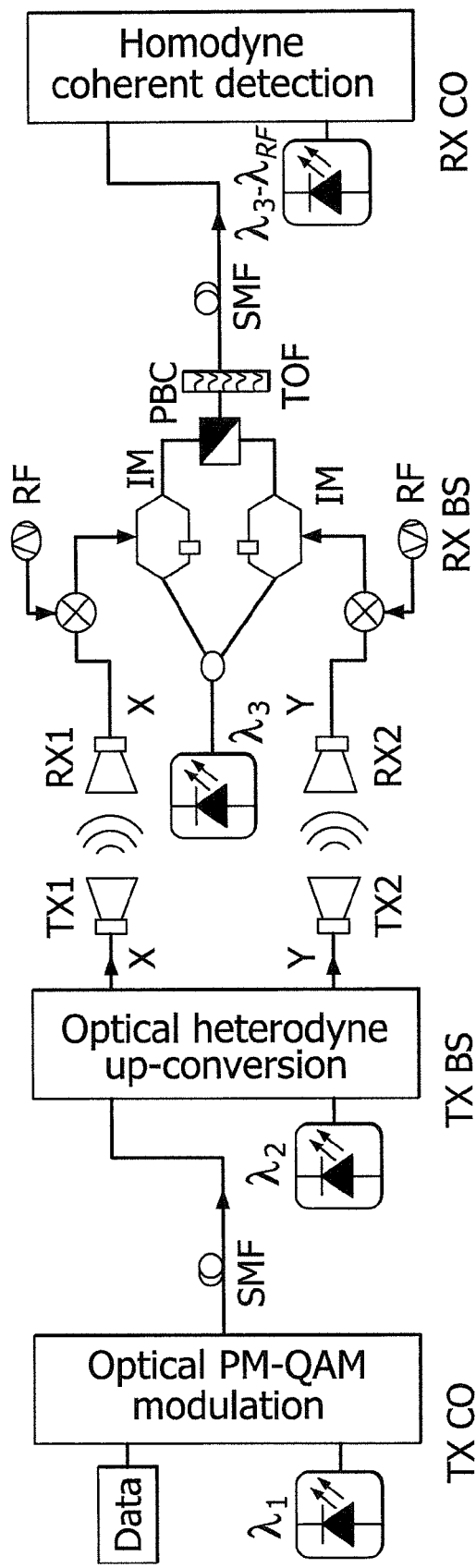
Figure 2A:
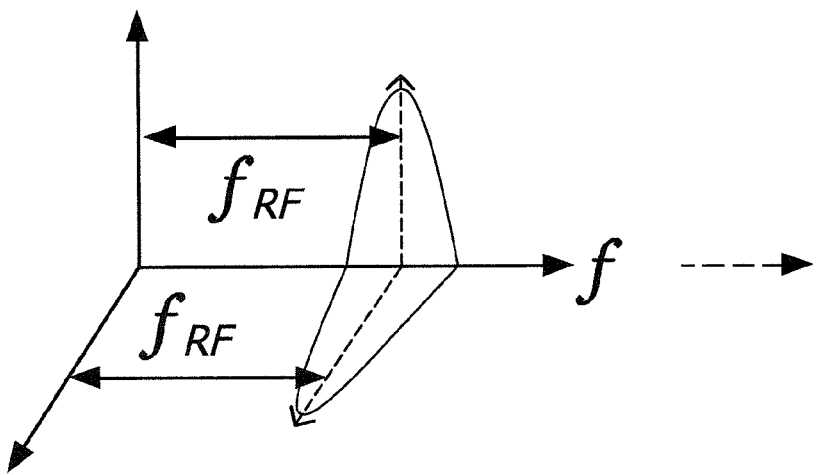
FIG. 2 shows the principle of integrated fiber-wireless-fiber link system for PM-QAM signal transmission without down-conversion. Schematic optical spectra after: a) optical heterodyne up-conversion; b) optical OCS modulation; c) TOF.
Figure 2B:
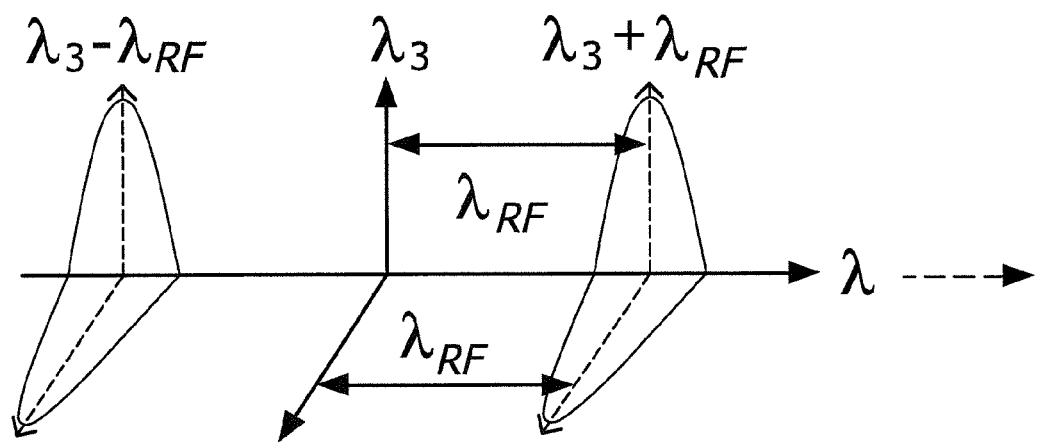
Figure 2C:
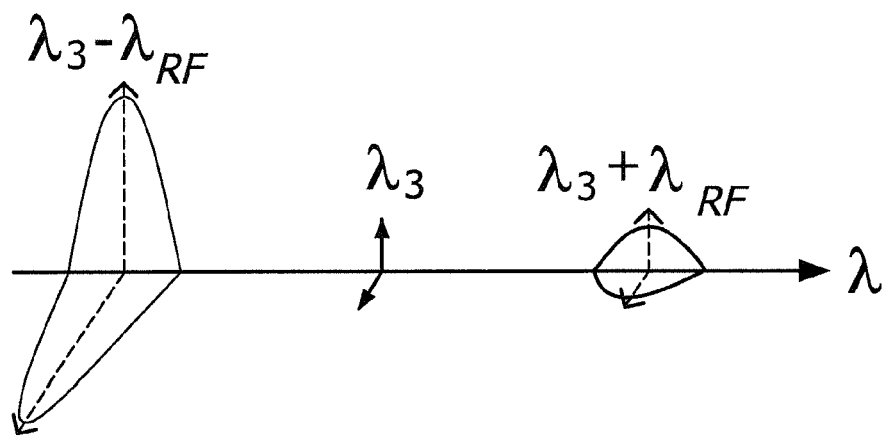
Figure 2D:
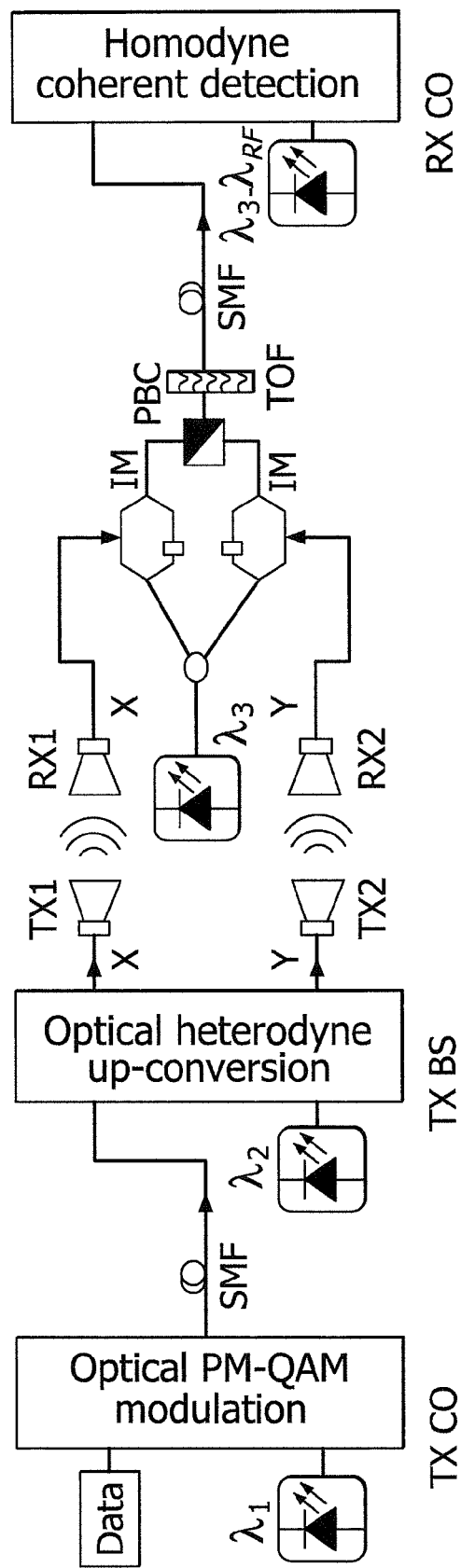

FIG. 1 shows the principle of our proposed fiber-wireless-fiber link for PM-QAM signal transmission. The PM-QAM modulated wireless mm-wave signal is generated based on remote heterodyning technique, and demodulated by RF transparent photonic technique based on homodyne coherent detection and baseband DSP. At the transmitter central office (CO), the CW lightwave at $\lambda_1$ is externally modulated by the transmitter data and then polarization multiplexed to generate the PM-QAM modulated optical baseband signal. At the transmitter base station (BS), the PM-QAM modulated optical baseband signal after fiber transmission is heterodyne beating with the CW lightwave at $\lambda_2$ and up-converted to the PM-QAM modulated wireless signal at a mm-wave frequency of $f_{RF}=c|1/\lambda_1-1/\lambda_2|$ (c is the velocity of light). Then, the PM-QAM modulated wireless mm-wave signal is delivered by a 2×2 MIMO wireless link [6], which consists of two pairs of transmitter and receiver horn antennas (HAs). At the receiver BS, the received wireless mm-wave signal externally modulates the CW lightwave at $\lambda_3$ to generate the E-field modulated signal at the optical carrier suppression (OCS) point. When the bandwidth of the external modulator is not enough, we can use an electrical mixer to down-convert the mm-wave signals before their modulation. The upper sideband (or lower sideband) and the optical carrier are filtered out by the subsequent tunable optical filter (TOF), and thus only an equivalent PM-QAM modulated optical baseband signal is sent to the receiver CO after fiber transmission. At the receiver CO, the transmitter data is recovered from the PM-QAM modulated optical baseband signal by homodyne coherent detection and baseband DSP. Insets a-c in FIG. 1 give the schematic optical spectra after heterodyne up-conversion, optical OCS modulation and TOF, respectively. For the PM-QAM signal, the fiber transmission from the transmitter CO to the transmitter BS and from the receiver BS to the receiver CO as well as the 2×2 MIMO wireless delivery from the transmitter BS to the receiver BS can be all considered based on a 2×2 MIMO model and denoted by a 2×2 Jones matrix. The multiplication of three 2×2 Jones matrixes is still a 2×2 matrix. Thus, the classic CMA equalization can be used at the receiver CO to realize PM-QAM signal polarization de-multiplexing.

If the modulator's bandwidth is large enough, we do not need to use down-conversion. The following architecture is can be used as shown in FIG. 2. Here the down-conversion unit is removed, but the IM should have enough bandwidth.

FIG. 3 shows the experimental setup the fiber-wireless-fiber link at W-band, which can in order realize up to 109.6-Gb/s PM-QAM signal transmission over 80-km SMF-28, 2-m 2×2 MIMO wireless link and 80-km SMF-28.

At the transmitter CO, the CW lightwave from ECL1 at 1549.38 nm is modulated by a 10~27.4-Gbaud electrical binary signal using an I/Q modulator. The electrical binary signal has a PRBS length of $2^{15}-1$ and is generated from a PPG. Then, the generated optical QAM signal passes through an EDFA and polarization multiplexed by a polarization multiplexer. The generated PM-QAM modulated optical baseband signal is launched into 80-km SMF-28, which has 18-dB average fiber loss and 17-ps/km/nm CD at 1550 nm without optical dispersion compensation at a launched power of 6 dBm into fiber.

Figure 3A:
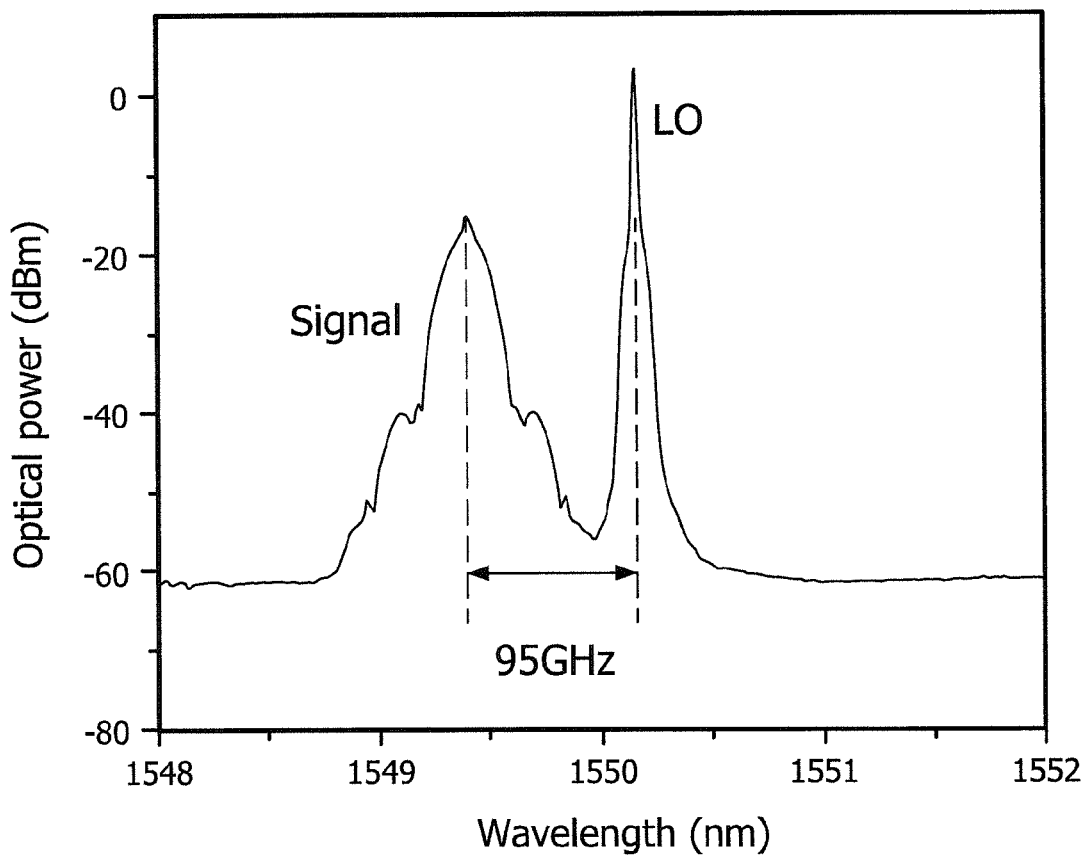
FIG. 3 shows the experimental setup. Optical spectra after: a) polarization diversity at the transmitter BS; b) the PBC at the receiver BS; c) the second 80-km SMF-28 transmission; d) architecture of down-conversion. D.C: down-conversion.
Figure 3E:
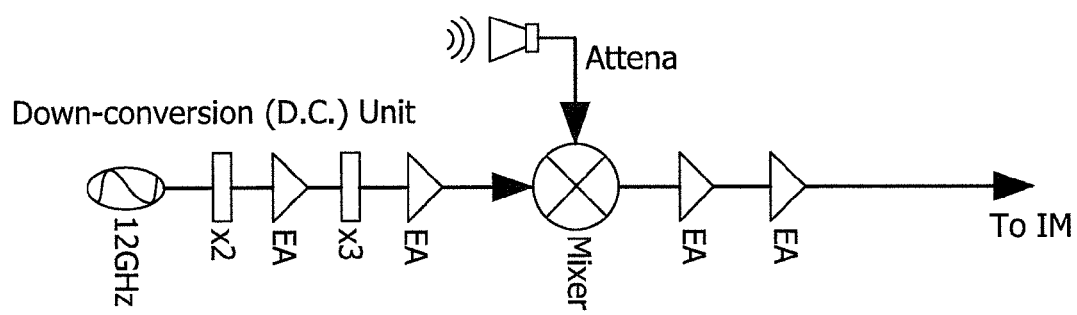

At the transmitter BS, ECL2 at 1550.14 nm functioned as LO has 95-GHz frequency offset relative to ECL1. Two polarization beam splitters (PBSs) and two OCs are used to implement polarization diversity of the received optical signal and LO in optical domain before heterodyne beating. FIG. 3a shows the optical spectrum (0.1-nm resolution) for 50-Gb/s bit rate after polarization diversity. 95-GHz frequency spacing exists between the signal and the LO. Two single-ended photo detectors (PDs), each with 90-GHz 3-dB bandwidth and 9-dBm input power, directly up-convert the PM-QAM modulated optical baseband signal into the PM-QAM modulated wireless mm-wave signal at W-band.

The generated PM-QAM modulated wireless mm-wave signal is delivered over 2-m 2×2 MIMO wireless link at W-band. Each pair of transmitter and receiver HAs has a 2-m wireless distance, the X- and Y-polarization wireless links are parallel and two transmitter (receiver) HAs have a 10-cm wireless distance. Each HA has 25-dBi gain. A 12-GHz sinusoidal RF signal firstly passes through an active frequency doubler (×2) and an EA in serial, and is then halved into two branches by a power divider. Next, each branch passes through a passive frequency tripler (×3) and an EA. As a result of this cascaded frequency doubling, an equivalent 72-GHz RF signal is provided for the corresponding balanced mixer. Therefore, the X- and Y-polarization components centered on 23 GHz (IF2=23 GHz) are obtained after first-stage down conversion. Then two cascaded electrical amplifiers with 3 dB bandwidth of 40 GHz after the mixers are employed to boost the electrical signals before they are used to drive an IM.

Figure 3B:
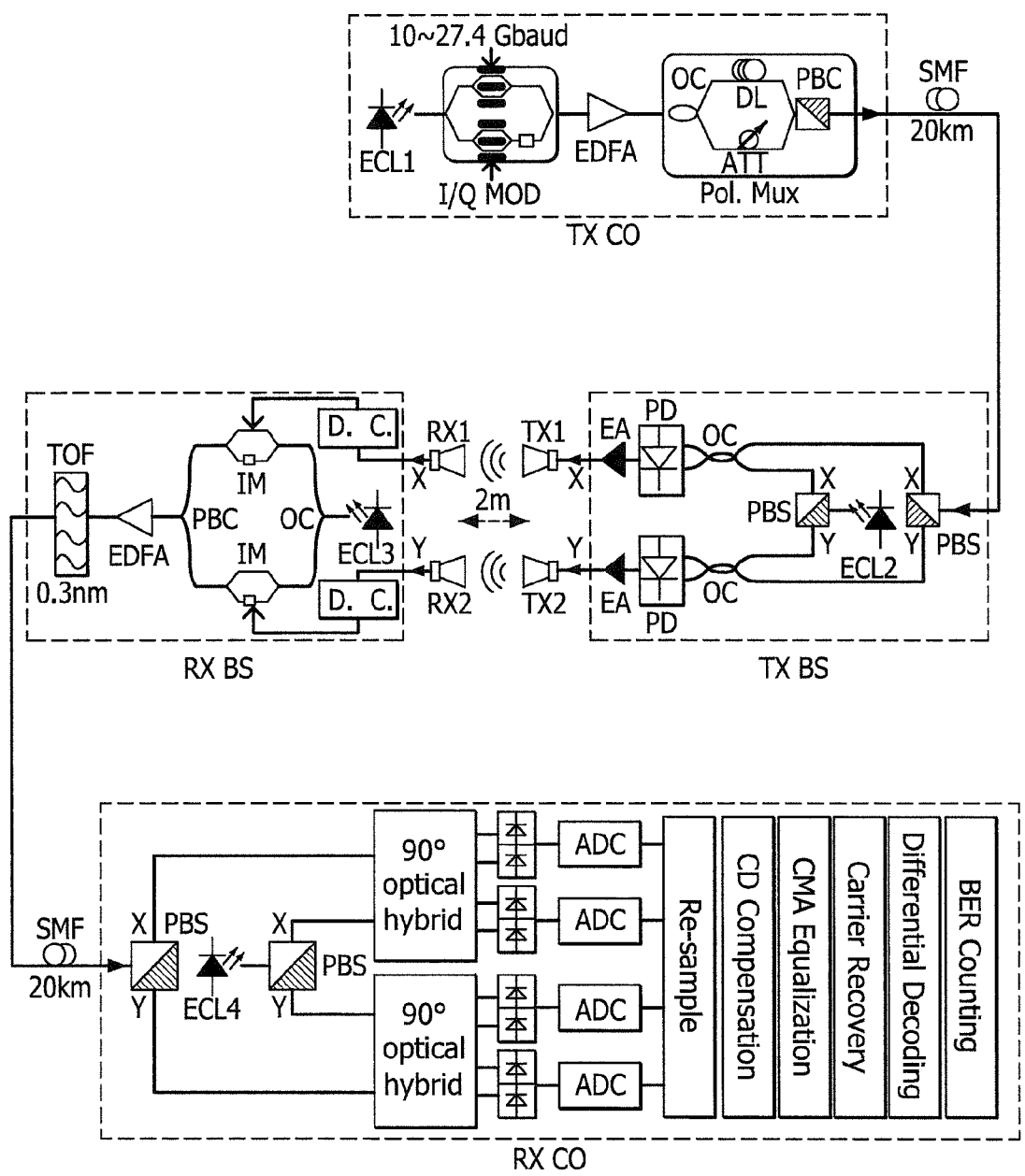
Figure 3C:
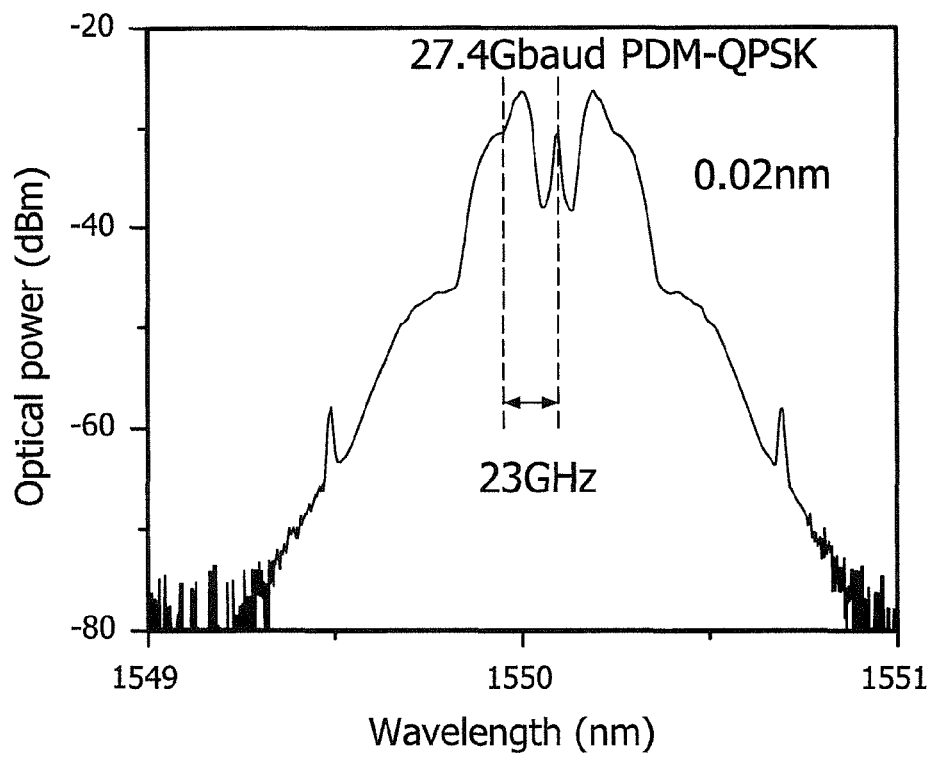
Figure 3D:
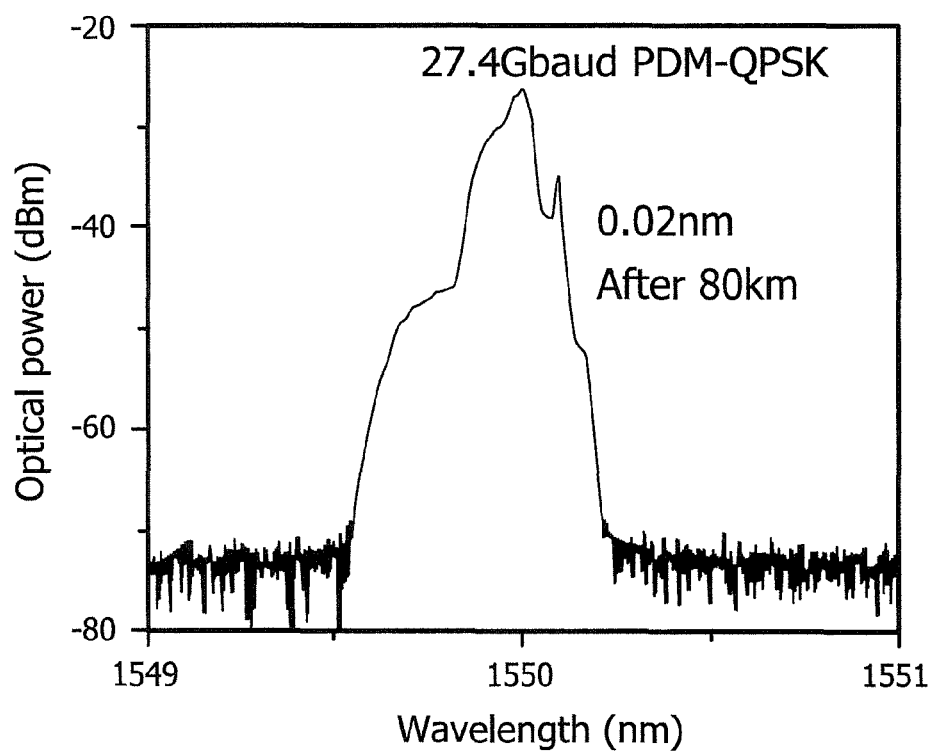

At the receiver BS, the CW lightwave from ECL3 at 1550.07 nm is first split by a polarization-maintaining OC into two branches. Each branch is modulated by the X- or Y-polarization component of the received wireless mm-wave signal with the aid of an intensity modulator (IM). Each IM has a 3-dB bandwidth of ~36 GHz, a 2.8-V half-wave voltage and a 5-dB insertion loss. Each IM is DC-biased at the OCS point for E-field modulation. A PBC is used to recombine the two modulated branches. FIG. 3b shows the optical spectrum (0.1-nm resolution) for 109.6-Gb/s after the PBC. The generated optical OCS signal has an optical carrier at 1550.08 nm and two PM-QAM modulated sidebands separated by 23 GHz from the optical carrier. The relatively large power of the optical carrier is due to a limited extinction ratio and the uncompensated driving voltage on IM. Then, a 0.6-nm TOF is used to suppress the upper sideband and the optical carrier as well as ASE noise. The generated optical baseband signal is sent into 80-km SMF-28.

At the receiver CO, ECL4 functioned as LO has an operating wavelength identical to that of the optical baseband signal. A polarization-diversity 90° hybrid is used to realize polarization- and phase-diversity coherent detection of the LO and the received optical signal before the balanced detection. The analog-to-digital conversion is realized in the real-time digital oscilloscope (OSC) with 80-GSa/s sampling rate and 30-GHz electrical bandwidth. The baseband DSP is carried out after analog-to-digital conversion. In this experiment, the BER is counted over 10×106 bits (10 data sets, and each set contains 106 bits).

Figure 4A:
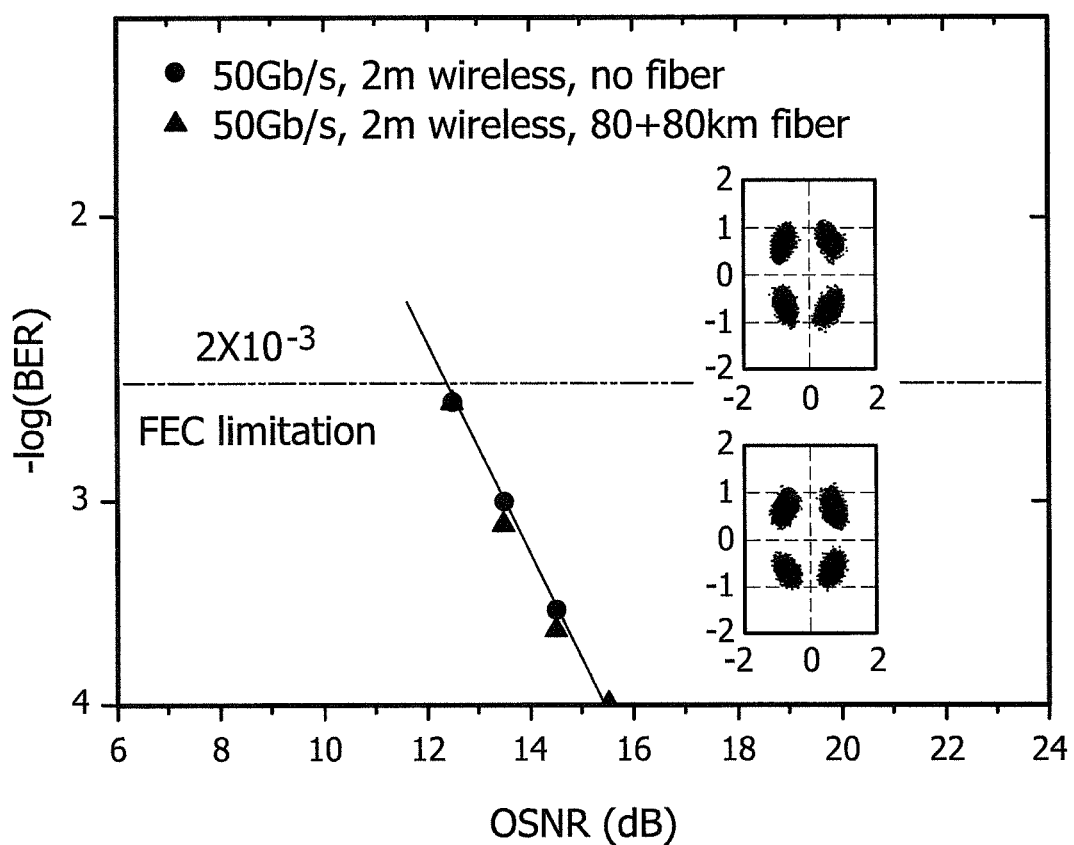
FIG. 4 shows: a) BER versus OSNR for 50-Gb/s bit rate; b) BER versus OSNR for 40~109.6-Gb/s bit rate with 2-m wireless delivery and (80+80)-km SMF-28 transmission.

FIG. 4a shows the BER versus the OSNR for the 50-Gb/s PM-QAM signal transmission over the optical-wireless-optical link. Here, without fiber transmission denotes the optical signal is transmitted back to back from the transmitter CO to the transmitter BS and from the receiver BS to the receiver CO. 80+80 km SMF-28 transmission does not cause any OSNR penalty. The constellations of X- and Y-polarization are inserted in FIG. 4a.

Figure 4B:
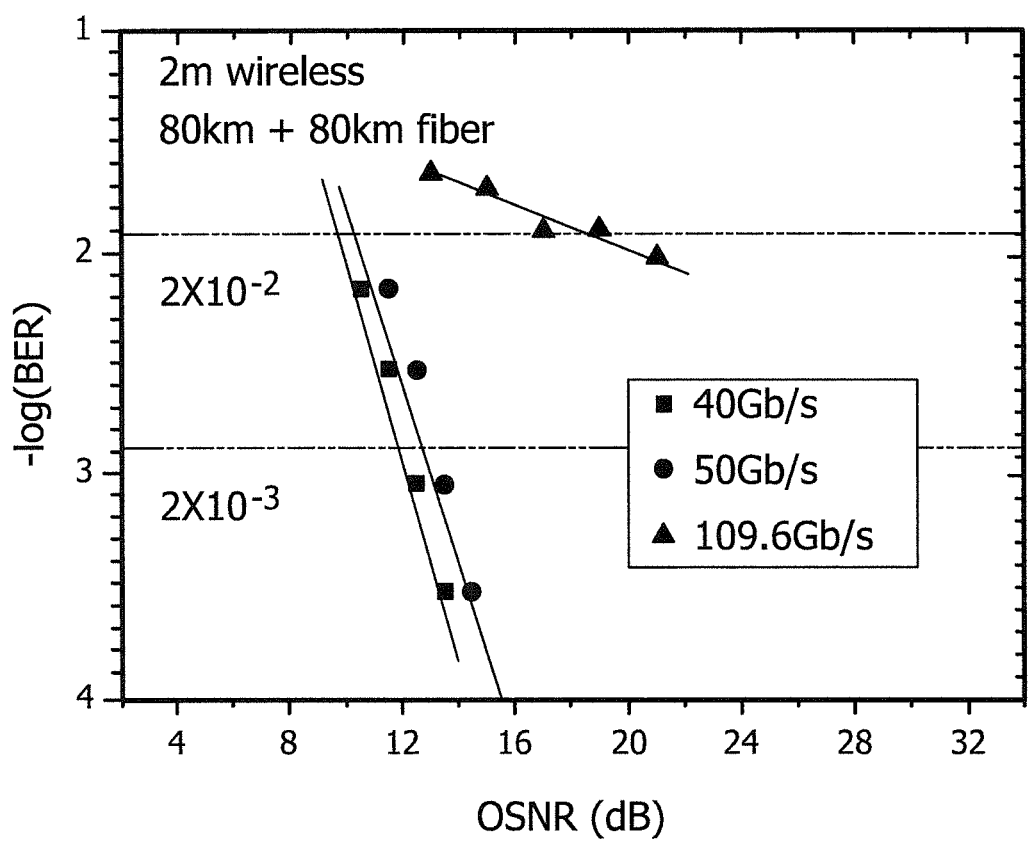
Figure 5:
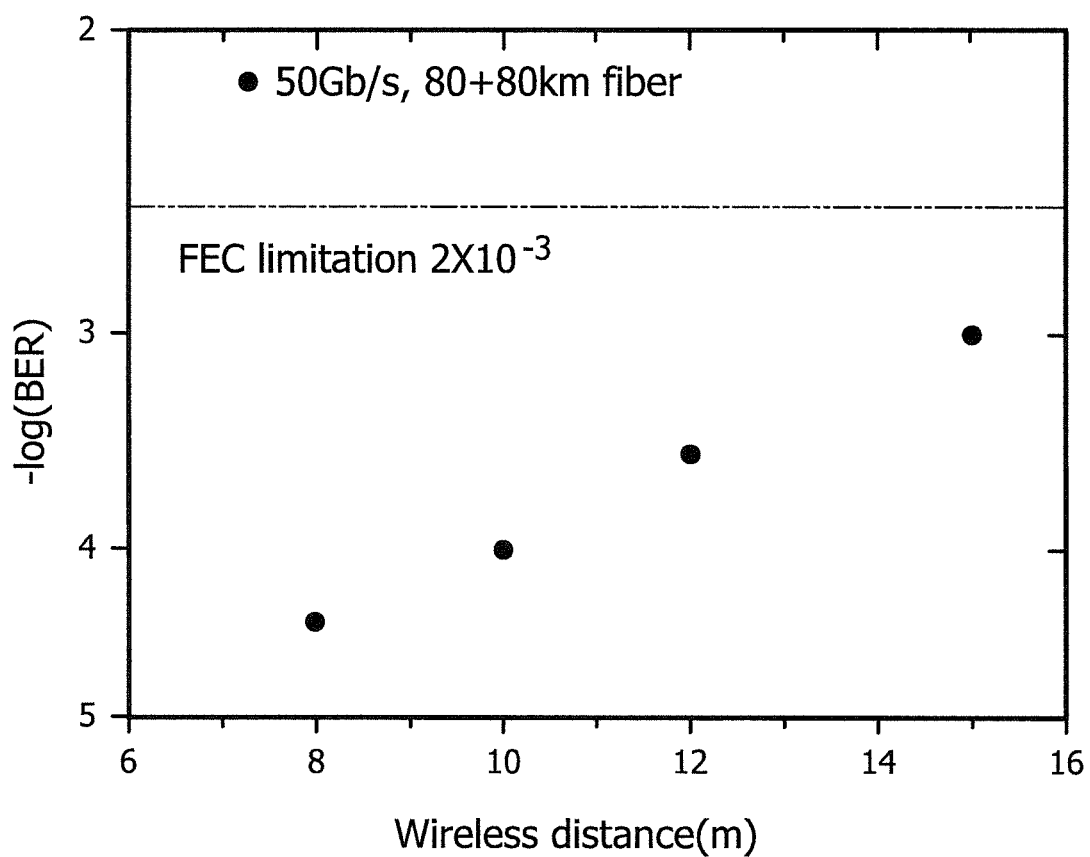
FIG. 5 shows BER versus OSNR for 50-Gb/s bit rate with 80+80 km SMF-28 transmission at different wireless distance.

FIG. 4b shows the BER versus the OSNR for the PM-QAM signal transmission over the fiber-wireless-fiber link with 2-m wireless delivery and (80+80)-km SMF-28 transmission at the bit rate of 40, 50 and 109.6 Gb/s, respectively. The required OSNR for 40 and 50 Gb/s is 11.5 and 12.5 dB at a BER of $2\times10^{-3}$. There exists an error floor at the BER of $\sim2\times10^{-2}$ for 109.6-Gb/s bit rate, which is due to the limited OSNR (the maximal value is 21 dB). If we consider 20% FEC overhead, the pure bit rate is 91.3 Gb/s. We can fix the bit rate at 50 Gb/s, while extending the wireless transmission distance up to 15 m, the measured BER vs. the transmission distance is shown in FIG. 5. The BER is smaller than $1\times10^{-3}$ when the transmission distance is up to 15 m.

CONCLUSIONS

We propose and experimentally demonstrate an integrated optical wireless system at W-band, in which, up to 109.6-Gb/s PM-QAM signal has been transmitted for the first time over 80-km SMF-28, followed by transmission over 2-m 2×2 MIMO wireless link and finally traversing over another 80-km SMF-28 with a BER smaller than $2\times10^{-2}$, a third generation FEC limitation. The observed degradation of BER performance can be attributed to the increased wireless path loss at high frequencies. This implies that the seamlessly integrated fiber-wireless-fiber link at W-band is inherently tolerant for the MIMO service delivery and for high-speed mobile backhaul and high capacity fiber back-up systems, especially for emergency back-up communications.

REFERENCES

[1] NTT Group CSR Report 2011, http://www.ntt.co.jp/csr_e/2011report/.
[2] S. Koenig, et al., OFC 2013, PDP5B.4.
[3] X. Pang, et al., Opt. Express 19(25), 24944 (2011).
[4] Kanno, et al., Proc. ECOC 2012, We.3.B.2.
[5] X. Li, et al., Opt. Lett. 38(5), 742 (2013).

[6] X. Li, et al., Opt. Lett. 37(24), 5106 (2012).
[7] Z. Dong, et al., Proc. OFC 2013, OM3D.2.
[8] X. Li, et al., Opt. Express 21(16), 18812 (2013).
[9] R. Sambaraju, et al., Proc. OFC 2010, OML1.
[10] R. Sambaraju, et al., PTL, 22(22), 1650 (2010).

What is claimed:

1. A fiber-wireless transmitting system comprising:
a transmitter central office (CO), wherein a first lightwave is (i) modulated by transmitter data, and (ii) polarization multiplexed, to generate a PM-QAM modulated optical baseband signal; and
a transmitter base station (BS) operatively coupled to the transmitter CO by an optical fiber, wherein, after obtaining the PM-QAM modulated optical baseband signal from the transmitter central office via the optical fiber, the PM-QAM modulated optical baseband signal is (i) heterodyned with a second lightwave, and (ii) up-converted to a PM-QAM modulated wireless signal;
wherein the PM-QAM modulated wireless signal is at a mm-wave frequency of approximately $f_{RF}=c|1/\lambda_1-1/\lambda_2|$, wherein c is the velocity of light, $\lambda_1$ is the wavelength of the first lightwave, and $\lambda_2$ is the wavelength of the second lightwave.

2. The system of claim 1, further comprising a MIMO wireless transmitter having a plurality of horn antennas to transmit the PM-QAM modulated wireless signal.

3. The system of claim 2, further comprising:
a receiver having a plurality of horn antennas that receives the PM-QAM modulated wireless signal;
a receiver base station, wherein the PM-QAM modulated wireless signal modulates a third lightwave to generate an E-field modulated signal at an optical carrier suppression point, and wherein a sideband of the E-field modulated signal and an optical carrier are filtered out by a tunable optical filter resulting in an equivalent PM-QAM modulated optical baseband signal; and
a receiver central office operatively coupled to the receiver BS by a second optical fiber, wherein, after obtaining the equivalent PM-QAM modulated baseband signal from the receiver BS via the second optical fiber, transmitter data is recovered from the equivalent PM-QAM modulated optical baseband signal by homodyne coherent detection and baseband digital signal processing.

4. The system of claim 3, further comprising an electrical mixer to down-convert the received PM-QAM modulated wireless signal.

5. A fiber-wireless method comprising:
polarization multiplexing a modulated first lightwave to generate a PM-QAM modulated optical baseband signal;
transmitting the PM-QAM modulated optical baseband signal via an optical fiber; and
obtaining the PM-QAM modulated optical baseband signal from the optical fiber, and heterodyne beating with a second lightwave and up-converting the PM-QAM modulated optical baseband signal to form a PM-QAM modulated wireless signal;
wherein the PM-QAM modulated wireless signal is at a mm-wave frequency of approximately $f_{RF}=c|1/\lambda_1-1/\lambda_2|$, wherein c is the velocity of light, $\lambda_1$ is the wavelength of the first lightwave, and $\lambda_2$ is the wavelength of the second lightwave.

6. The method of claim 5, further comprising transmitting the PM-QAM modulated wireless signal via a MIMO wireless transmitter having a plurality of horn antennas.

7. The method of claim 6, further comprising:
receiving the PM-QAM modulated wireless signal;
modulating a lightwave by the PM-QAM modulated wireless signal to generate an E-field modulated signal at an optical carrier suppression point;
filtering out a sideband of the E-field modulated signal and an optical carrier resulting in an equivalent PM-QAM modulated optical baseband signal;
transmitting the equivalent PM-QAM modulated optical baseband signal via a second optical fiber; and
recovering transmitter data from the equivalent PM-QAM modulated optical baseband signal obtained from the second optical fiber, by homodyne coherent detection and baseband digital signal processing.

8. The method of claim 7, further comprising down-converting the received PM-QAM modulated wireless signal.

* * * * *